US011159396B2

(12) United States Patent
Ding

(10) Patent No.: US 11,159,396 B2
(45) Date of Patent: Oct. 26, 2021

(54) COMPUTER SYSTEM PROVIDING MIRRORED SAAS APPLICATION SESSIONS AND RELATED METHODS

(71) Applicant: CITRIX SYSTEMS, INC., Fort Lauderdale, FL (US)

(72) Inventor: Jian Ding, Jiangsu (CN)

(73) Assignee: CITRIX SYSTEMS, INC., Fort Lauderdale, FL (US)

( * ) Notice: Subject to any disclaimer, the term of this patent is extended or adjusted under 35 U.S.C. 154(b) by 0 days.

(21) Appl. No.: 16/171,618

(22) Filed: Oct. 26, 2018

(65) Prior Publication Data

US 2020/0136934 A1    Apr. 30, 2020

(51) Int. Cl.
*H04L 12/24* (2006.01)
*H04L 29/06* (2006.01)

(52) U.S. Cl.
CPC .......... *H04L 41/5096* (2013.01); *H04L 67/42* (2013.01)

(58) Field of Classification Search
CPC ........... H04L 29/0872; H04L 29/08522; H04L 12/1822
USPC ........................................ 709/203
See application file for complete search history.

(56) References Cited

U.S. PATENT DOCUMENTS

| | | | |
|---|---|---|---|
| 9,176,744 B2 | 11/2015 | Lee | |
| 9,538,345 B2 | 1/2017 | Sah et al. | |
| 2010/0262925 A1* | 10/2010 | Liu | G06Q 10/10 715/759 |
| 2013/0283283 A1* | 10/2013 | Wang | H04M 1/67 718/102 |
| 2014/0280486 A1* | 9/2014 | Seay | H04L 67/02 709/203 |
| 2015/0339112 A1* | 11/2015 | Ryu | G06F 11/324 717/174 |
| 2018/0174164 A1* | 6/2018 | B | G06Q 30/0202 |
| 2019/0155956 A1* | 5/2019 | Kesarwani | H04L 9/14 |

FOREIGN PATENT DOCUMENTS

| | | |
|---|---|---|
| CN | 106126035 | 11/2016 |
| EP | 3043249 | 7/2016 |

* cited by examiner

*Primary Examiner* — Mahran Y Abu Roumi
(74) *Attorney, Agent, or Firm* — Allen, Dyer, Doppelt + Gilchrist, PA

(57) ABSTRACT

A computer system may include a server configured to provide access to a plurality of shared applications, and a client computing device. The client computing device may have a display associated therewith and cooperate with the server to run shared applications from among the plurality of shared applications, determine at least one group of the shared applications running on the client computing device having a relationship therebetween based upon a sequence in which the shared applications are activated, and display the shared applications from the at least one group on the display.

16 Claims, 12 Drawing Sheets

COMPUTER SYSTEM PROVIDING MIRRORED SAAS APPLICATION SESSIONS AND RELATED METHODS

BACKGROUND

Traditionally, personal computers include combinations of operating systems, applications, and user settings, which are each managed individually by owners or administrators on an ongoing basis. However, many organizations are now using desktop virtualization to provide a more flexible option to address the varying needs of their users. In desktop virtualization, a user's computing environment (e.g., operating system, applications, and/or user settings) may be separated from the user's physical computing device (e.g., smartphone, laptop, desktop computer). Using client-server technology, a "virtualized desktop" and/or virtual applications may be stored in and administered by a remote server, rather than in the local storage of the client computing device.

Web applications are another approach to remotely provisioning and providing shared software applications. One example web application approach for software licensing and delivery is Software as a Service (SaaS). This is a cloud computing approach to software delivery by which software applications are centrally hosted in the cloud and provided on a subscription basis to users. SaaS applications are typically accessed on client devices with a thin client via a browser program, and may in some instances be provided through a virtual computing session.

SUMMARY

A computer system may include a server configured to provide access to a plurality of shared applications, and a client computing device. The client computing device may have a display associated therewith and cooperate with the server to run shared applications from among the plurality of shared applications, determine at least one group of the shared applications running on the client computing device having a relationship therebetween based upon a sequence in which the shared applications are activated, and display the shared applications from the at least one group on the display.

In an example implementation, the client computing device may be further configured to display a first menu on the display including the plurality of shared applications, and display a second menu on the display including the shared applications from the at least one group. The first and second menus may be displayed in a same window on the display, for example. In accordance with another example implementation, the second menu may be displayed in a floating window on the display.

In still another example implementation, the sequence in which the shared applications are activated may comprise a sequence in which the shared applications are launched on the client computing device. In another example implementation, the sequence in which the shared applications are activated may comprise a copy and paste sequence between the shared applications running on the client computing device. In still another example, the sequence in which the shared applications are activated may be based upon a timing between activation of the shared applications running on the client computing device.

In an example embodiment, the sequence in which the shared applications are activated may comprise a sequence of switching between the shared applications running on the client computing device. Moreover, the at least one group of shared applications may comprise a plurality of different groups of shared applications, and the client computing device may further cooperate with the server to determine a launch probability of each shared application across the plurality of different groups. Also, the shared applications included within the second menu may be based upon the determined launch probabilities. By way of example, the launch probabilities may be determined based upon an Apriori algorithm.

A related method may include providing access to a plurality of shared applications from a server. The method may further include, at a client computing device having a display associated therewith, displaying a first menu on the display including the plurality of shared applications, running shared applications selected from the first menu, determining at least one group of the shared applications running on the client computing device having a relationship therebetween based upon a sequence in which the shared applications are activated, and displaying a second menu on the display including shared applications from the at least one group.

A related non-transitory computer-readable medium may have computer-executable instructions for causing a client computing device to perform steps including displaying a first menu on the display including a plurality of shared applications available from a server, and running shared applications selected from the first menu. The steps may further include determining at least one group of the shared applications running on the client computing device having a relationship therebetween based upon a sequence in which the shared applications are activated, and displaying a second menu on the display including shared applications from the at least one group.

DETAILED DESCRIPTION

The present description is made with reference to the accompanying drawings, in which example embodiments are shown. However, many different embodiments may be used, and thus the description should not be construed as limited to the particular embodiments set forth herein. Like numbers refer to like elements throughout.

As will be appreciated by one of skill in the art upon reading the following disclosure, various aspects described herein may be embodied as a device, a method or a computer program product (e.g., a non-transitory computer-readable medium having computer executable instruction for performing the noted operations or steps). Accordingly, those aspects may take the form of an entirely hardware embodiment, an entirely software embodiment, or an embodiment combining software and hardware aspects.

Furthermore, such aspects may take the form of a computer program product stored by one or more computer-readable storage media having computer-readable program code, or instructions, embodied in or on the storage media. Any suitable computer readable storage media may be utilized, including hard disks, CD-ROMs, optical storage devices, magnetic storage devices, and/or any combination thereof.

Figure 1:
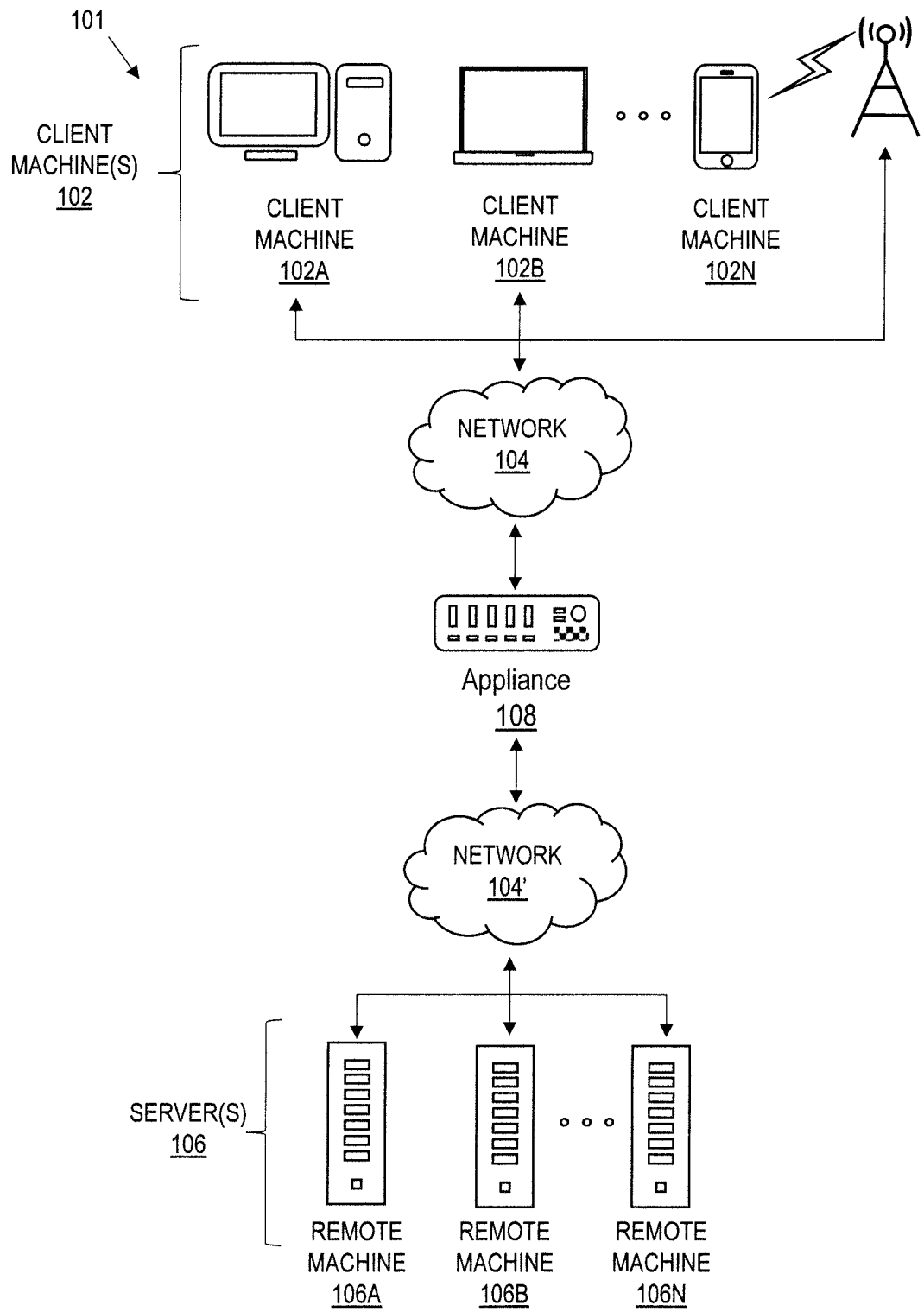
FIG. 1 is a block diagram of a network environment of computing devices in which various aspects of the disclosure may be implemented.

Referring initially to FIG. 1, a non-limiting network environment 101 in which various aspects of the disclosure may be implemented includes one or more client machines 102A-102N, one or more remote machines 106A-106N, one or more networks 104, 104', and one or more appliances 108 installed within the computing environment 101. The client machines 102A-102N communicate with the remote machines 106A-106N via the networks 104, 104'.

In some embodiments, the client machines 102A-102N communicate with the remote machines 106A-106N via an intermediary appliance 108. The illustrated appliance 108 is positioned between the networks 104, 104' and may also be referred to as a network interface or gateway. In some embodiments, the appliance 108 may operate as an application delivery controller (ADC) to provide clients with access to business applications and other data deployed in a datacenter, the cloud, or delivered as Software as a Service (SaaS) across a range of client devices, and/or provide other functionality such as load balancing, etc. In some embodiments, multiple appliances 108 may be used, and the appliance(s) 108 may be deployed as part of the network 104 and/or 104'.

The client machines 102A-102N may be generally referred to as client machines 102, local machines 102, clients 102, client nodes 102, client computers 102, client devices 102, computing devices 102, endpoints 102, or endpoint nodes 102. The remote machines 106A-106N may be generally referred to as servers 106 or a server farm 106. In some embodiments, a client device 102 may have the capacity to function as both a client node seeking access to resources provided by a server 106 and as a server 106 providing access to hosted resources for other client devices 102A-102N. The networks 104, 104' may be generally referred to as a network 104. The networks 104 may be configured in any combination of wired and wireless networks.

A server 106 may be any server type such as, for example: a file server; an application server; a web server; a proxy server; an appliance; a network appliance; a gateway; an application gateway; a gateway server; a virtualization server; a deployment server; a Secure Sockets Layer Virtual Private Network (SSL VPN) server; a firewall; a web server; a server executing an active directory; a cloud server; or a server executing an application acceleration program that provides firewall functionality, application functionality, or load balancing functionality.

A server 106 may execute, operate or otherwise provide an application that may be any one of the following: software; a program; executable instructions; a virtual machine; a hypervisor; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other set of executable instructions.

In some embodiments, a server 106 may execute a remote presentation services program or other program that uses a thin-client or a remote-display protocol to capture display output generated by an application executing on a server 106 and transmit the application display output to a client device 102.

In yet other embodiments, a server 106 may execute a virtual machine providing, to a user of a client device 102, access to a computing environment. The client device 102 may be a virtual machine. The virtual machine may be managed by, for example, a hypervisor, a virtual machine manager (VMM), or any other hardware virtualization technique within the server 106.

In some embodiments, the network 104 may be: a local-area network (LAN); a metropolitan area network (MAN); a wide area network (WAN); a primary public network 104; and a primary private network 104. Additional embodiments may include a network 104 of mobile telephone networks that use various protocols to communicate among mobile devices. For short range communications within a wireless local-area network (WLAN), the protocols may include 802.11, Bluetooth, and Near Field Communication (NFC).

Figure 2:
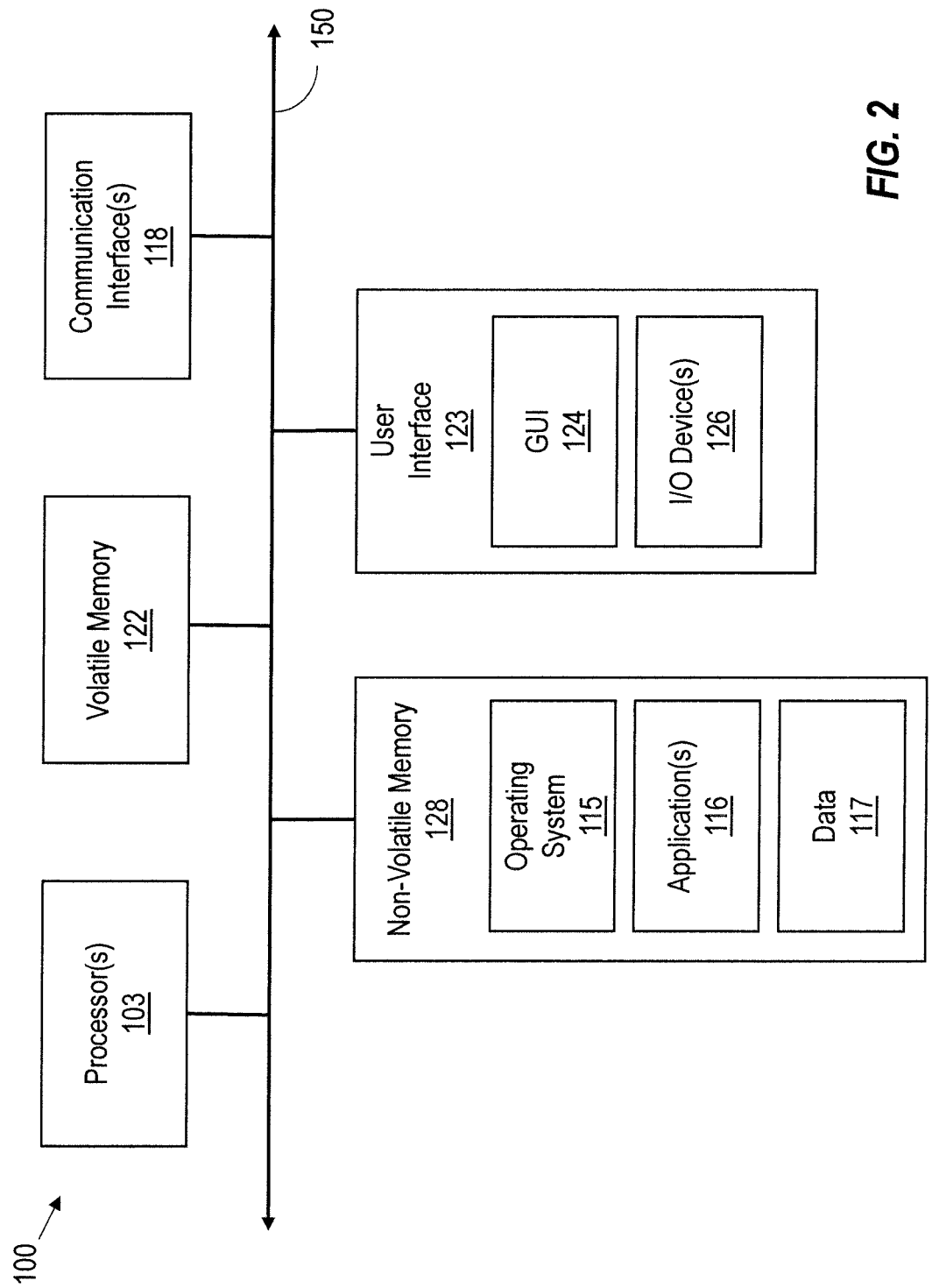
FIG. 2 is a block diagram of a computing device useful for practicing an embodiment of the client machines or the remote machines illustrated in FIG. 1.

FIG. 2 depicts a block diagram of a computing device 100 useful for practicing an embodiment of client devices 102, appliances 108 and/or servers 106. The computing device 100 includes one or more processors 103, volatile memory 122 (e.g., random access memory (RAM)), non-volatile memory 128, user interface (UI) 123, one or more communications interfaces 118, and a communications bus 150.

The non-volatile memory 128 may include: one or more hard disk drives (HDDs) or other magnetic or optical storage media; one or more solid state drives (SSDs), such as a flash drive or other solid-state storage media; one or more hybrid magnetic and solid-state drives; and/or one or more virtual storage volumes, such as a cloud storage, or a combination of such physical storage volumes and virtual storage volumes or arrays thereof.

The user interface 123 may include a graphical user interface (GUI) 124 (e.g., a touchscreen, a display, etc.) and one or more input/output (I/O) devices 126 (e.g., a mouse, a keyboard, a microphone, one or more speakers, one or more cameras, one or more biometric scanners, one or more environmental sensors, and one or more accelerometers, etc.).

The non-volatile memory 128 stores an operating system 115, one or more applications 116, and data 117 such that, for example, computer instructions of the operating system 115 and/or the applications 116 are executed by processor(s)

103 out of the volatile memory 122. In some embodiments, the volatile memory 122 may include one or more types of RAM and/or a cache memory that may offer a faster response time than a main memory. Data may be entered using an input device of the GUI 124 or received from the I/O device(s) 126. Various elements of the computer 100 may communicate via the communications bus 150.

The illustrated computing device 100 is shown merely as an example client device or server, and may be implemented by any computing or processing environment with any type of machine or set of machines that may have suitable hardware and/or software capable of operating as described herein.

The processor(s) 103 may be implemented by one or more programmable processors to execute one or more executable instructions, such as a computer program, to perform the functions of the system. As used herein, the term "processor" describes circuitry that performs a function, an operation, or a sequence of operations. The function, operation, or sequence of operations may be hard coded into the circuitry or soft coded by way of instructions held in a memory device and executed by the circuitry. A processor may perform the function, operation, or sequence of operations using digital values and/or using analog signals.

In some embodiments, the processor can be embodied in one or more application specific integrated circuits (ASICs), microprocessors, digital signal processors (DSPs), graphics processing units (GPUs), microcontrollers, field programmable gate arrays (FPGAs), programmable logic arrays (PLAs), multi-core processors, or general-purpose computers with associated memory.

The processor 103 may be analog, digital or mixed-signal. In some embodiments, the processor 103 may be one or more physical processors, or one or more virtual (e.g., remotely located or cloud) processors. A processor including multiple processor cores and/or multiple processors may provide functionality for parallel, simultaneous execution of instructions or for parallel, simultaneous execution of one instruction on more than one piece of data.

The communications interfaces 118 may include one or more interfaces to enable the computing device 100 to access a computer network such as a Local Area Network (LAN), a Wide Area Network (WAN), a Personal Area Network (PAN), or the Internet through a variety of wired and/or wireless connections, including cellular connections.

In described embodiments, the computing device 100 may execute an application on behalf of a user of a client device. For example, the computing device 100 may execute one or more virtual machines managed by a hypervisor. Each virtual machine may provide an execution session within which applications execute on behalf of a user or a client device, such as a hosted desktop session. The computing device 100 may also execute a terminal services session to provide a hosted desktop environment. The computing device 100 may provide access to a remote computing environment including one or more applications, one or more desktop applications, and one or more desktop sessions in which one or more applications may execute.

Additional descriptions of a computing device 100 configured as a client device 102 or as a server 106, or as an appliance intermediary to a client device 102 and a server 106, and operations thereof, may be found in U.S. Pat. Nos. 9,176,744 and 9,538,345, which are incorporated herein by reference in their entirety. The '744 and '345 patents are both assigned to the current assignee of the present disclosure.

Figure 3:
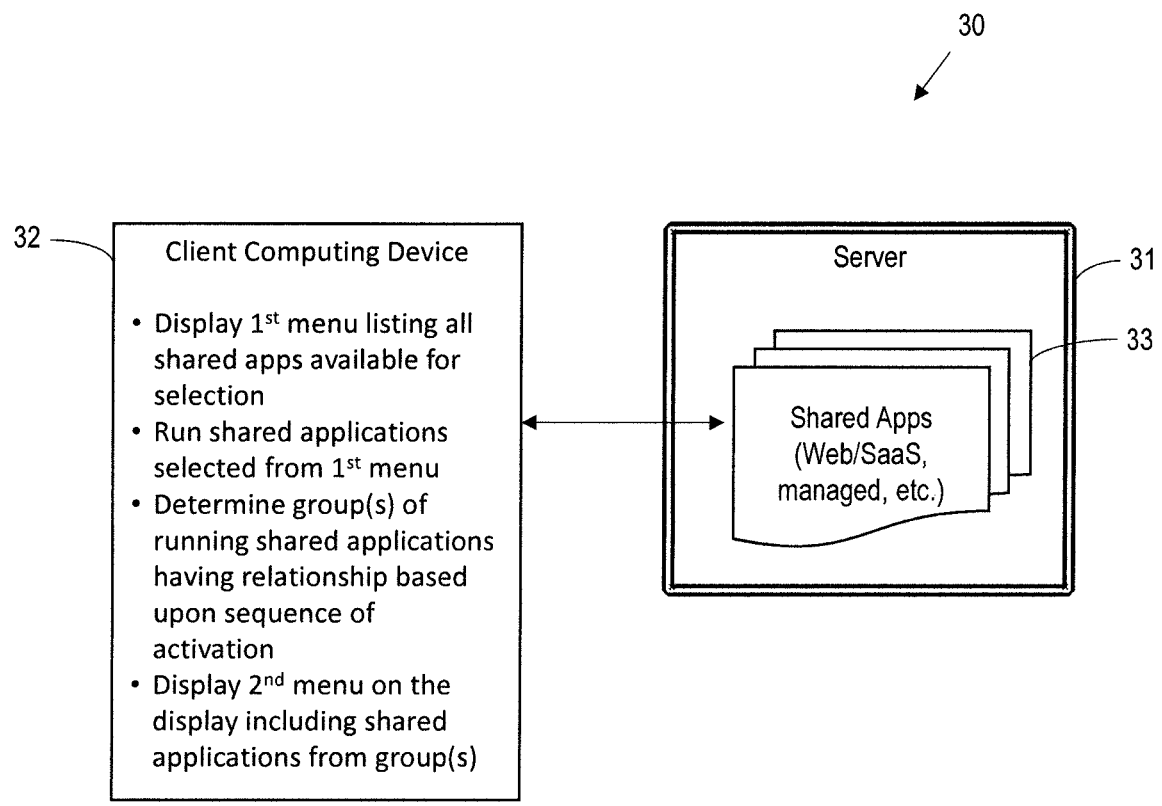
FIG. 3 is a block diagram of a computing system providing shared application launch prediction and access features in accordance with an example embodiment.
Figure 4:
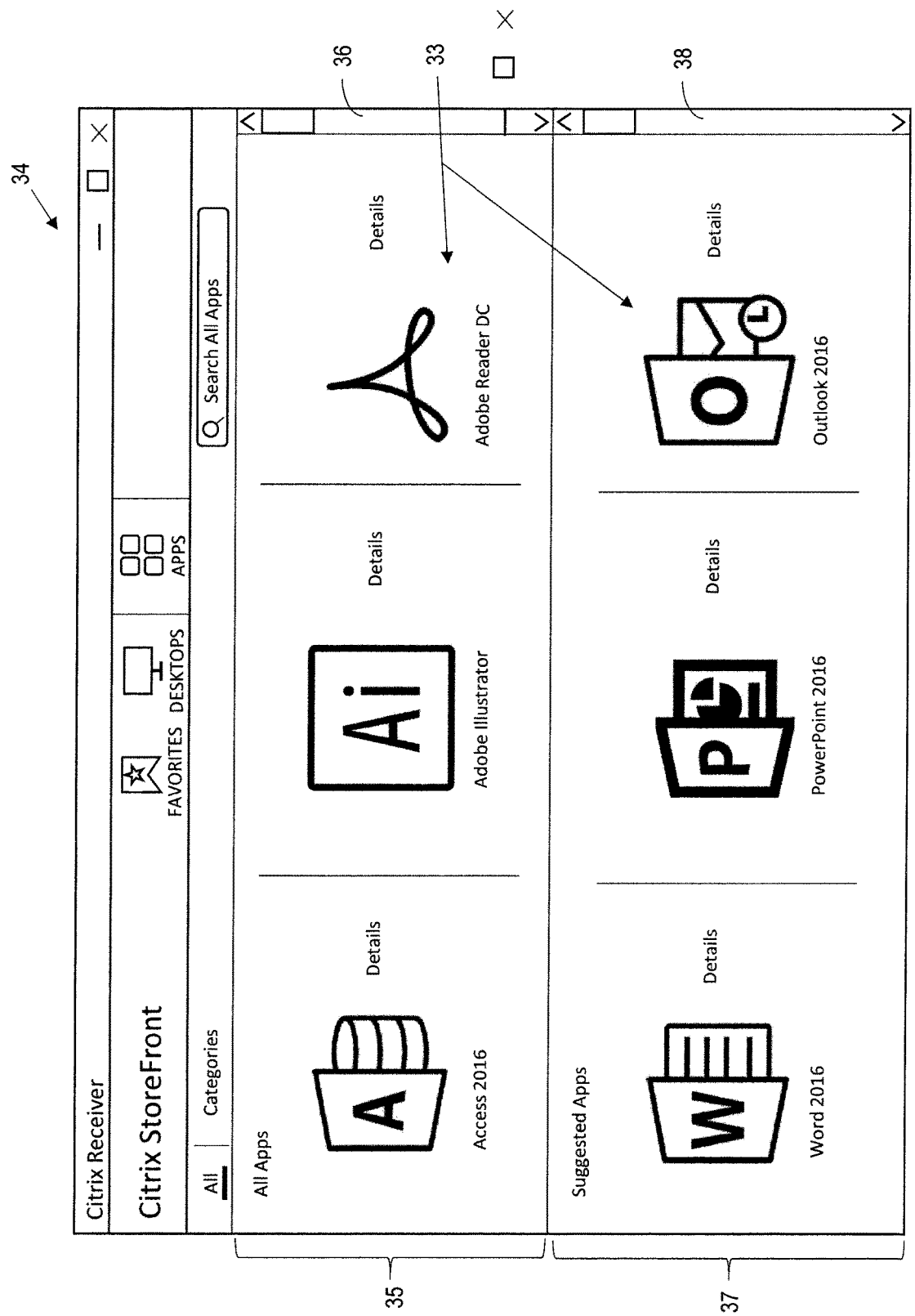
FIG. 4 is a screen shot of a display for the client computing device of the system of FIG. 3 providing recommended shared application selections in accordance with an example implementation.
Figure 5:
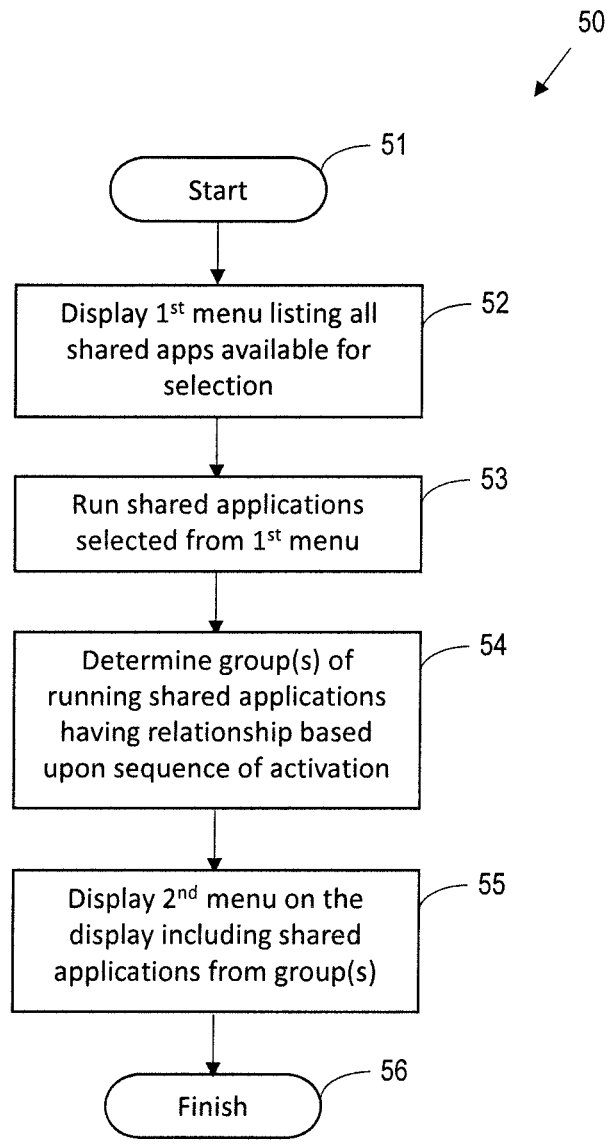
FIGS. 5-6 are flow diagrams illustrating method aspects associated with the system of FIG. 3.

Turning now to FIG. 3-4 and the flow diagram 50 of FIG. 5, a computer system 30 is now described which advantageously determines relationships between shared or published applications based upon user operations, and predictively prompts or recommends applications 33 to be launched based upon the relationships. The computer system 30 accordingly addresses a technical problem associated with software identification and launch through an enhanced interface that automatically learns relationships between different applications and predicts applications to be launched, and accordingly may provide enhanced user experience (UX) and productivity.

By way of background, many companies have moved their work environment to the cloud, which allows network administrators to publish numerous shared applications (e.g., Web/SaaS apps, hosted/native applications, etc.) to all end users. However, while this avoids the need to locally store many different applications on client devices, the large amount of shared applications available to an enterprise user in many instances can be overwhelming. That is, to launch a shared application, an end user is typically provided with an application search window or menu including all of the available applications, and may have to spend a significant amount of time scrolling through these available options to find the desired application.

In one example managed computing approach, Citrix Receiver provides access to published applications via Citrix StoreFront. While Citrix Receiver provides a subscription function for applications, end users are still required to configure subscription settings manually. Moreover, where there are many applications in the subscription, the end user may still likely end up scrolling through numerous menu choices to find the desired applications. In an example use case, an end user may launch AppX and want to copy certain content from AppX to AppY. To do so, the user would need to open the Citrix Receiver client, find AppY, launch it, and then perform the paste operation.

The system 30 illustratively includes a server 31 configured to provide access to a plurality of shared applications or apps 33 to one or more client computing devices 32 (e.g., smartphones, desktop computers, tablet computers, etc.). By way of example, such shared applications may include Web/SaaS apps, hosted/native apps, etc. Beginning at Block 51, the client computing device 32 cooperates with the server 31 (e.g., via communications over a wired and or wireless network) to display a first menu 35 on an associated display 34 listing all of the plurality of shared applications 33 available for selection. In the illustrated example, a scroll bar 36 allows the user (e.g., via a mouse, touch screen, etc.) to scroll through all of the available apps in the first menu 35, which are arranged in alphabetical order (here, the first three applications shown in alphabetical order are Access 2016, Adobe Illustrator, and Adobe Reader DC). However, it will be appreciated that other menu configurations may also be used in different embodiments.

The client computing device 30 further cooperates with the server 31 to run shared applications 33 selected from the first menu 35. As these applications 33 are run over time, an activation history may be collected with respect to the shared applications running on the client computing device 32. From this, a group(s) of applications 33 that has an association between them based upon a sequence in which these applications are activated may be determined, at Block 54. As will discussed further below, "activation" may pertain to the way in which applications are launched, and/or the way in which switching occurs between different applications that are already launched (i.e., switching between which application is "on top" or in the active window). Based upon this activation history, a second menu 37 (illustrated in FIG. 4) may then be displayed on the display 34 including shared applications 33 from the group, at Block 55, which illustratively concludes the method of FIG. 4 (Block 56). A scroll bar 38 allows scrolling within the second menu 37 in the illustrated example. Various approaches may be used for the order in which the applications 33 are displayed, in the menu 37, e.g., alphabetically, in order of a highest launch probability, etc.

Generally speaking, the example approaches for determining or collecting the activation history of the shared applications discussed herein may be implemented using machine learning. In various embodiments, such as in Mobile Device Management (MDM) configurations, an agent program may be installed on the client device 32 which interfaces with the server 31 to provide managed access to the shared applications 33. The agent program may accordingly monitor and record launching of shared applications, as well as switching between different applications once launched, and apply machine learning techniques to determine relationships or patterns between activation of different applications. One example client agent which may be used to implement the various configurations described herein is Citrix Receiver. However, it should be noted that a client agent need not be used in all embodiments, such as in Mobile Application Management (MAM) configurations. More particularly, the monitoring and/or machine learning may be performed on the server 31 responsive to user input received from the client computing device 32. Example server-side programs which may be used to implement the various embodiments set forth herein may include Citrix XenMobile, XenApp, and XenDesktop, for example, although other suitable systems and programs may also be used.

Figure 6:
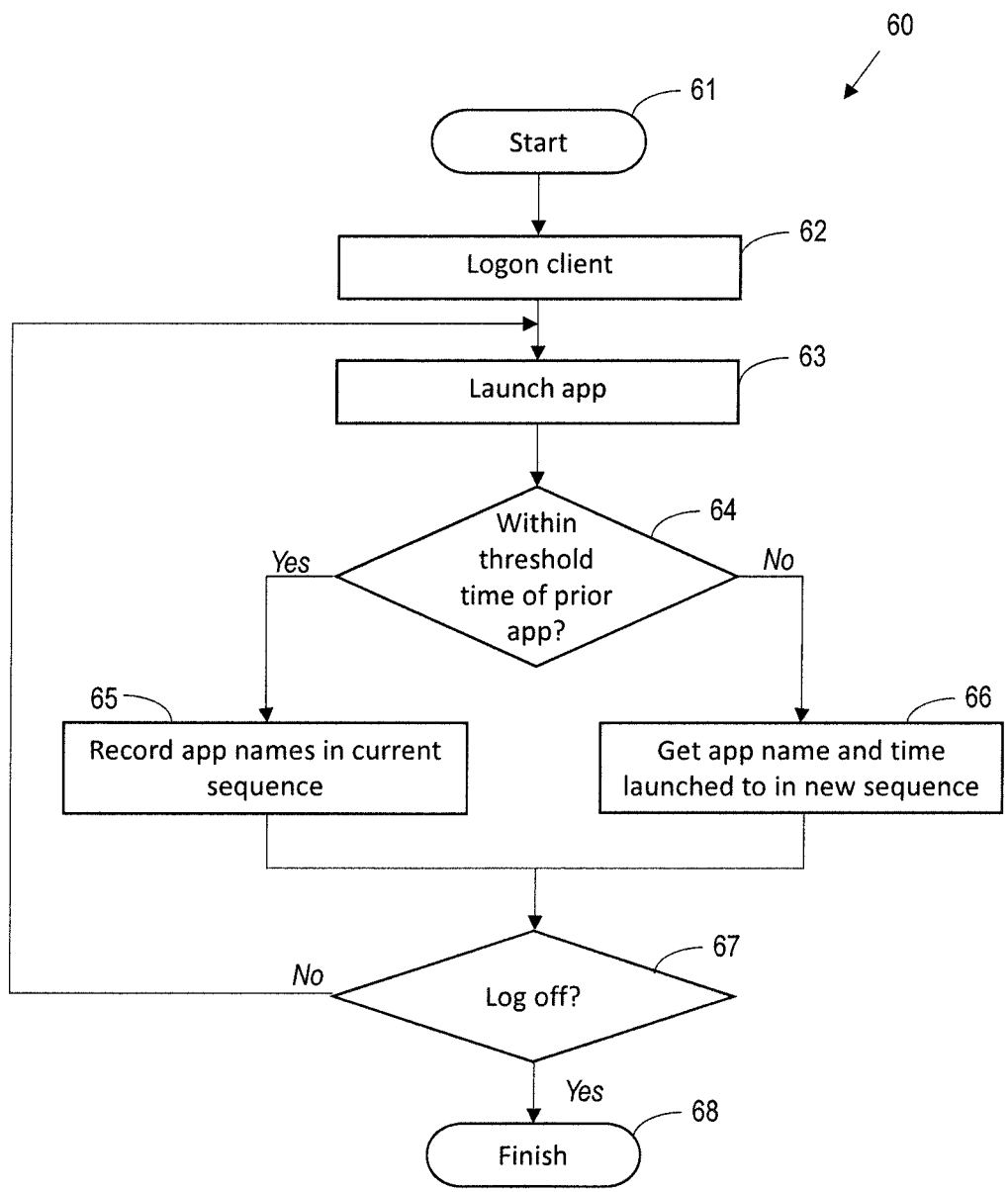

Referring now to the flow diagram 60 of FIG. 6, a first example implementation of the system 30 monitors application launch activation. That is, in the illustrated example the activation history corresponds to a launch sequence of the shared applications running on the client computing device 32. Beginning at Block 61, when the client computing device logs on (e.g., to a client agent program or to the server 31), it is presented with access to all of the available shared applications 33. In the example shown in FIG. 4, this is done through the Citrix StoreFront interface of Citrix Receiver, though here again other programs and interfaces for application launching may be used in different embodiments. As shared applications 33 are launched (Block 63), if an application is launched within a threshold time of a prior application, at Block 64, then the machine learning may determine that there is an association between these two applications and that they are part of a sequence to be recorded (Block 65), e.g., in a database at the client computing device 32 or the server 31.

For example, when a user logs on, the user may typically open an email program, Web browser, and a word processing program within a certain time period, though not necessarily in the same order every time. Nevertheless, because launching of these applications occurs within a given time period (e.g., within ten minutes of the prior application launch, although other time periods may be used), the machine learning records the sequence of applications launched within this time period, at Block 65. For example, after AppX launches, if within a 10-minute time slot the user launches AppY, the client computing device 32 (or server 31) will record the sequence of "AppX->AppY". Moreover, if multiple applications are launched within this time, all of these applications will be recorded within the sequence, such as "AppX->AppY->AppZ". In this way, an association is determined between these applications because they were opened within the given time window. If the application is not being launched within the threshold time limit of a previously launched application, then the machine learning may instead get the name and time this latest application is launched and look to learn a new sequence starting with this latest application, at Block 66. That is, the latest application would become the first in a new sequence to be learned, and the threshold time limit would reset from the time that this latest application was launched. This process may continue until the client logs off, at Block 67, which illustratively concludes the method of FIG. 6 (Block 68).

Figure 7:
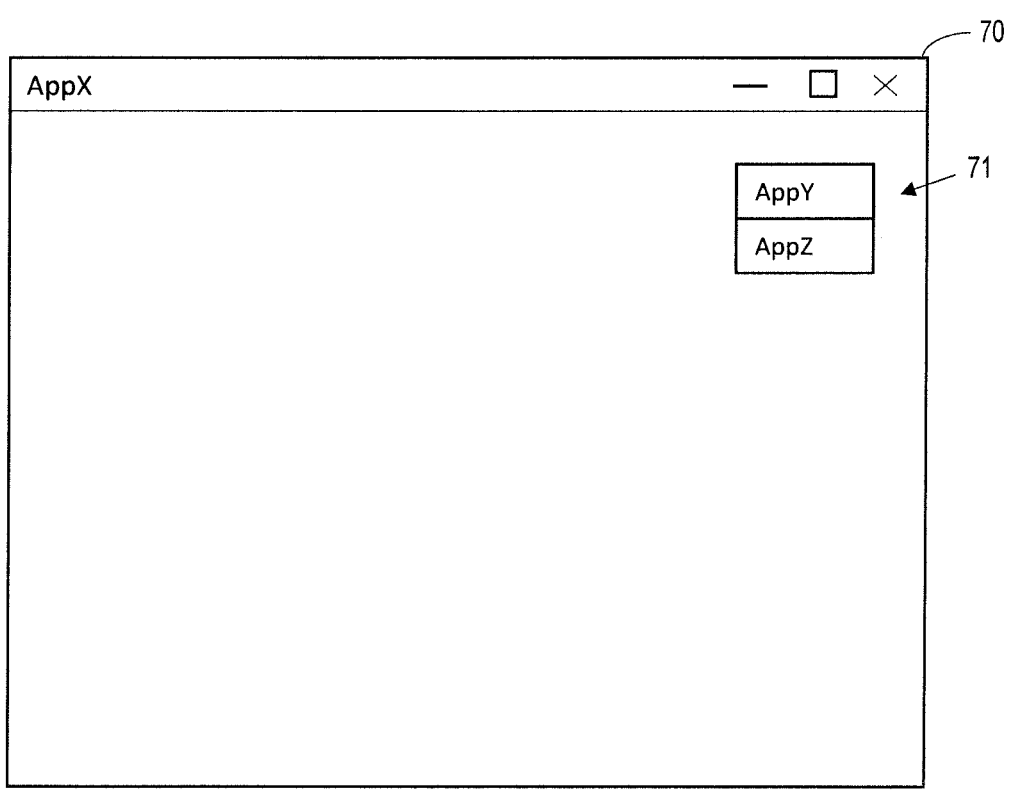
FIG. 7 is screen shot of a display for the client computing device of the system of FIG. 3 providing a floating menu of recommended shared application selections in accordance with an example implementation.

Referring additionally to FIG. 7, once a sequence of applications is learned, when one of the applications in the sequence is opened (e.g., AppX in the above-noted example) in a window 70, a second menu may be presented in a floating window 71 including the other two applications in the learned sequence, namely AppY and AppZ in the present example. Here, the floating window 71 is generated as an overlay on the AppX window 70, but in other embodiments the floating window may be outside of the application window, or presented in a different form than a floating window, if desired. In the example implementation of FIG. 4, the applications 33 learned in the sequence Appx->AppY->AppZ may be presented in the second menu 37 of recommended applications (here Word 2016, PowerPoint 2016, and Outlook 2016). In other embodiments, a menu could be nested under an icon, such that the icon could be clicked to reveal the menu of suggested applications. Another possibility is that the menu may take the form of a banner (e.g., at the top or bottom of the window), and the applications listed in the banner may be updated at desired intervals and could be scrollable (e.g., side-to-side, etc.). Other suitable forms of menus may also be used in different embodiments.

Figure 8:
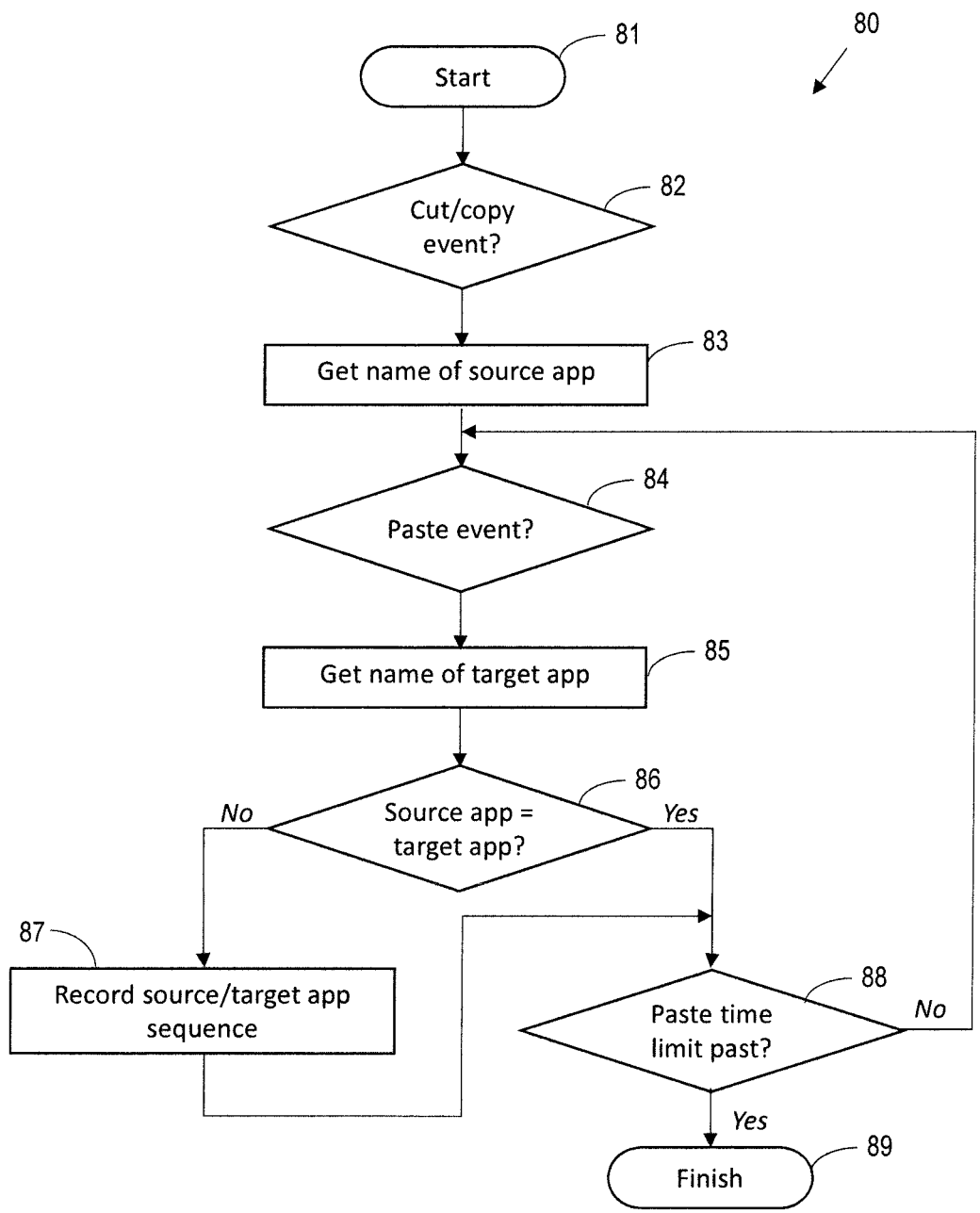
FIGS. 8-9 are flow diagrams illustrating additional method aspects associated with the system of FIG. 3.

Another example implementation is now described with reference to the flow diagram 80 of FIG. 8, in which the system 30 monitors a sequence of cut/copy paste operations between shared applications running on the client computing device to determine an association therebetween. Generally speaking, in a cut or copy operation, selected information or content (e.g., text, images, etc.) from a source program is placed on the operating system clipboard to be reproduced or pasted in a target application. A cut operation is similar to a copy operation, except that it includes the additional step of removing or deleting the selecting information from the source program once it is pasted from the clipboard to a target location.

Beginning at Block 81, the client computing device 32 may monitor the cut/copy and paste operations between two (or more) different shared application, at Block 82. By way of example, an Application Program Interface (API) may be added to the MDM agent, etc., to "hook" on cut/copy and paste operations. When a cut/copy event is triggered, the source application name from which the cut/copy event was initiated may be collected, at Block 83. For the present discussion, it will be assumed that a cut/copy event is initiated from a source application AppX.

When a paste event is triggered, at Block 84, the name of the target application to which the copied information was pasted (e.g., AppY) is then collected as well, at Block 85. However, in some instances the source application and the target application may be the same. That is, the information in question might have been cut/copied from one location in an application (e.g., in a word processing application) to another location in the same application. Thus, the client computing device 32 (or server 31 in some embodiments)

may further check to determine if the source and target applications are the same, at Block 86. If not, then the association between the two applications may be recorded (here "AppX->AppY"), at Block 87, and this associated sequence of applications may then be presented in a second menu of recommended applications as discussed above. Otherwise, if the source and target applications are the same, then there is no application group association that needs to be recorded. In some instances, a paste event may be triggered multiple times to different applications, in which case the associated sequence of all of these applications may be recorded (e.g., "AppX->AppY->AppZ").

In the illustrated example, a time limit is imposed between cut/copy and paste operations (or successive paste operations), at Block 88, although the time limit need not be included in all embodiments. For example, a ten minute time limit (or other time limit) may be imposed between cut/copy and paste events (of successive paste events) in order for an association to be created between the different applications. The method of FIG. 8 illustratively concludes at Block 89.

Figure 9:
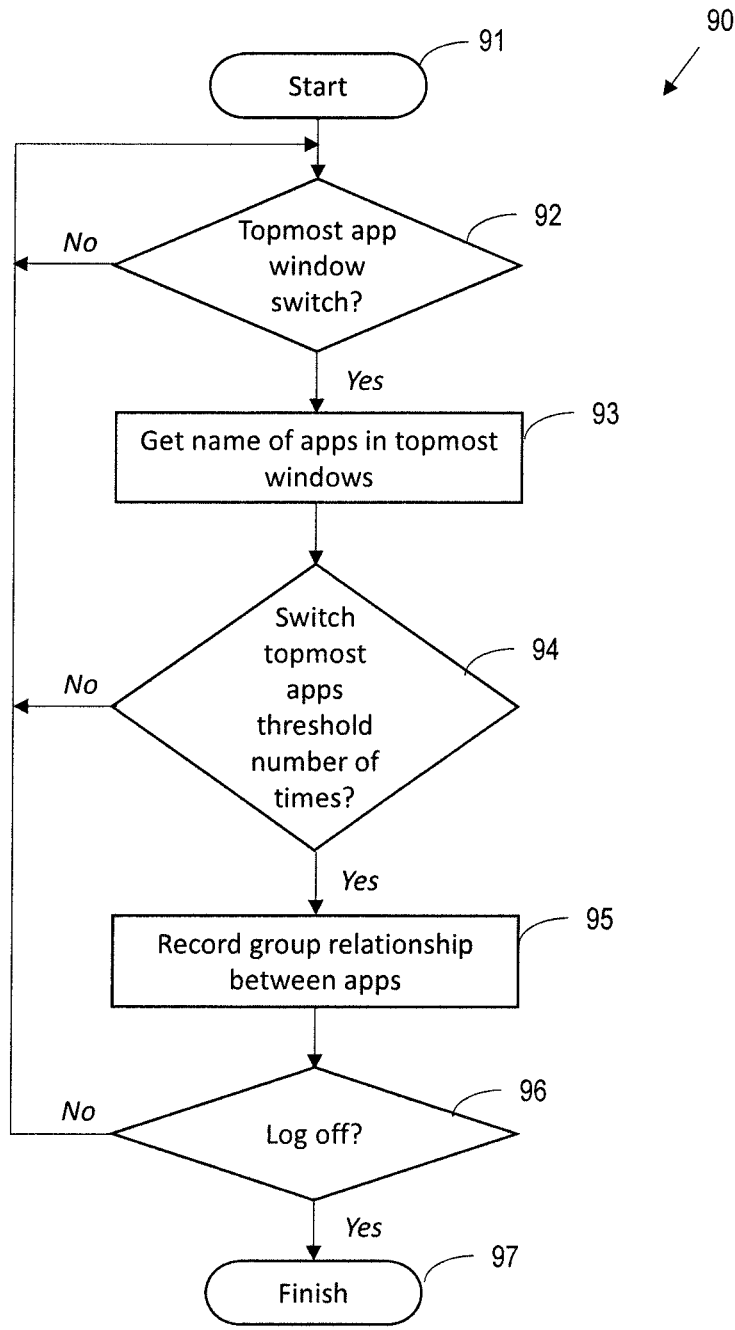

Turning now to the flow diagram 90 of FIG. 9, in another example implementation the system 30 may determine associated applications based upon a sequence of switching between different shared applications. It should be noted that the switching does not have to be directly back-and-forth between two applications, e.g., there may be switching to another application(s) during the group learning process (e.g., while learning a group relationship based upon switching AppA and AppB, intermediate switching to AppC need not reset the learning process between AppA and AppB, although this may also be done in some embodiments). Beginning at Block 91, the client computing device 32 may determine when a switch occurs between the topmost or active application window running on the client computing device 32, at Block 92. Here again, this may be done via an API in some implementations which uses a hook to determine when the active application window changes, for example. When there is a change between active application windows, the client computing device 32 or server 31 may then capture the names of the applications that have been switched between, at Block 93. If switching between these applications occurs a threshold number of times (e.g., three or more times, although different numbers may be used in different embodiments), at Block 94, then an association or relationship between the applications is determined and recorded based upon the switching back and forth between the applications. This process may continue until the client computing device 32 logs off, at Block 96, and the illustrated method concludes at Block 97. It should be noted that a time threshold may also be used in this implementation as similarly discussed above. That is, it may be required that the threshold number of switching has to occur within a certain period of time for a group association to be registered, for example.

Figure 10:
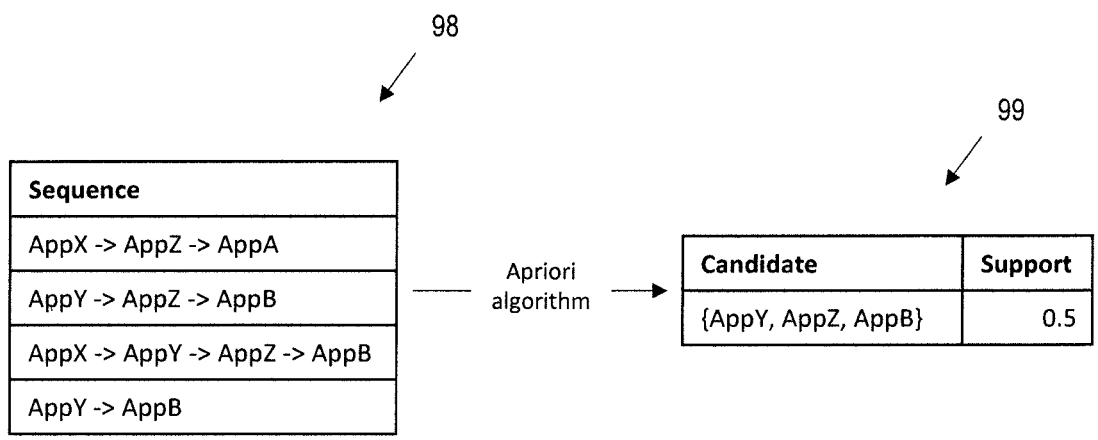
FIG. 10 is a series of tables illustrating an example application launch probability determination operation performed by the system of FIG. 3.

Referring additionally to FIG. 10, in some embodiments the system 30 may also record multiple sequences of associated applications from the approaches described with reference to FIGS. 6, 8, and/or 9 (or other suitable approaches for determining associations between applications), and then determine a probability of a given application to be selected based upon the recorded sequences. By way of example, assume the following sequences of applications (shown in the table 98 of FIG. 10) have been recorded from one of the foregoing approaches:

1) AppX->AppY->AppZ->AppA
2) AppY->AppC->AppB->AppX
3) AppX->AppY
4) AppZ->AppY
5) AppC->AppB

An optimization approach, such as an Apriori algorithm or other suitable algorithm, may then be used on the sequences to find the most probable candidates based upon the recorded sequences. In the example shown in FIG. 10, when the above-noted sequences are run through the Apriori algorithm, it is determined that the end user has a 50% probability (shown as Support=0.5 in the illustrated table 99) of launching AppY, AppZ, and AppB after logon. In other words, after launching AppY, there is a 50% probability of launching AppZ and AppB. Here again, these relationships may be stored (and updated over time) in a database, and thereafter used to generate the second menu of recommended applications to launch, e.g., in the menu 37 or in the floating window 71, as discussed above.

It should be noted that other approaches may be used for determining associations or relationships between shared applications 33 for the purposes of recommending applications to be launched. For example, one example implementation may utilize lookup functions, such as if a second application was used to look up a term present in a first application (e.g., if the second application was a dictionary application). Similar to the cut/copy and paste embodiment described above, drag and drop operations between different applications (which may be considered another form of cutting and pasting) may also be used. Still another example would include opening applications that have a particular content type in common. One example would be for audio files, such as if the same audio file is opened by two different applications having audio capabilities, then a relationship may be determined or inferred between these two applications. Here again, other suitable approaches for determining an association between applications may also be used in different embodiments.

Figure 11:
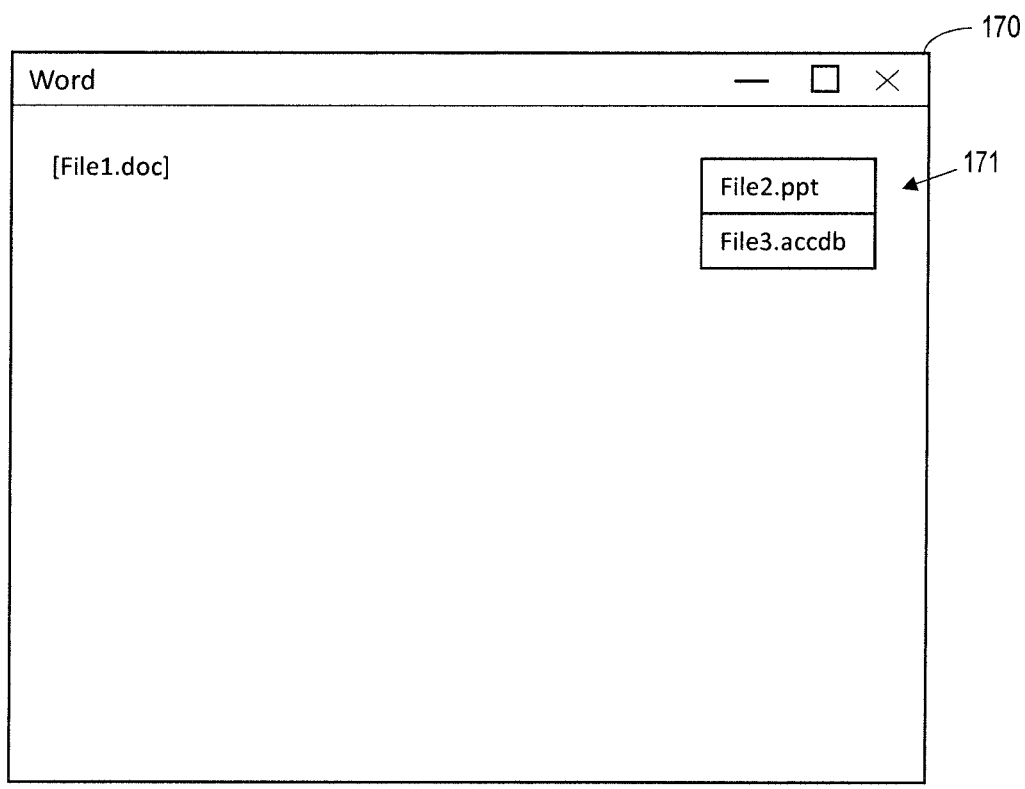
FIG. 11 is screen shot of a display for the client computing device of the system of FIG. 3 providing a floating menu of recommended file selections in accordance with an example implementation.
Figure 12:
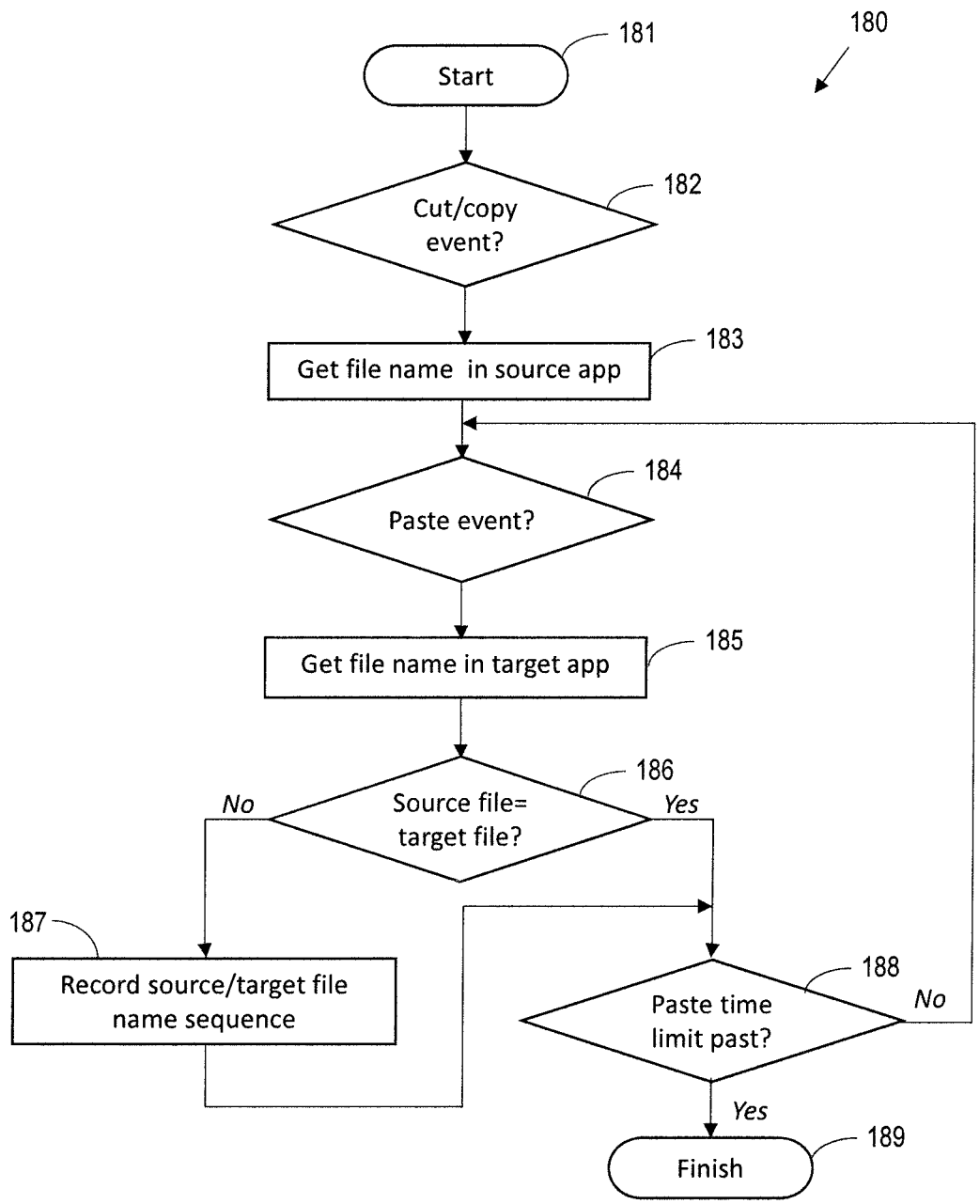
FIG. 12 is a flow diagram illustrating a method for learning and providing recommended file selections in accordance with an example aspect.

Turning to FIG. 11 and the flow diagram 180 of FIG. 12, another example embodiment is now described in which a group of associated files (e.g., word processing documents, audio files, presentation files, database files, etc.) may be associated with one another based upon a cut/copy and paste sequence between them. Similar to the embodiment described in FIG. 8 above, the method begins (Block 181) with monitoring for a cut/copy event, at Block 182. However, in this case, the machine learning captures the name of the file that is opened in the source application (i.e., the source file for the cut/copy), at Block 183, rather than the application itself as described above. When a paste event occurs, at Block 184, the machine learning gets the name of the file in the target application that is being pasted into (i.e., the target file), at Block 185. So long as the source and target files are not the same (Block 186), a source/target file name sequence is recorded, at Block 187. If they are the same, then no association is created. Once again, a time limit may be imposed between the cut/copy and paste operations in order for an association to be created, at Block 188. The method of FIG. 12 illustratively concludes at Block 189.

In the example menu 170, the user is working in a Word window 170 and opens a document named File1.doc. In this example, a previous group association between File1.doc and two other files, namely a PowerPoint file File2.ppt and an Access file File3.accdb, was created from a cut/copy and paste sequence. As such, when File1.doc is opened, a floating window 171 is provided (here within the window 170, although it may be outside the window or another type of menu in other embodiments as described above) listing the other two files within the group, i.e., File2.ppt and File3.accdb. It should be noted that this approach of learning group associations between different files, as opposed to applications, may similarly be performed using the approaches described above with reference to FIGS. 3-4 and 9-10 as well.

Many modifications and other embodiments will come to the mind of one skilled in the art having the benefit of the teachings presented in the foregoing descriptions and the associated drawings. Therefore, it is understood that the foregoing is not to be limited to the example embodiments, and that modifications and other embodiments are intended to be included within the scope of the appended claims.

That which is claimed is:

1. A computing device comprising:
a processor and associated memory and having a display associated therewith, the processor configured to
access shared applications from among a plurality of shared applications through a server,
determine an activation history of shared applications accessed by the client computing device, the activation history including a number of times the shared applications are accessed and a sequential order in which the shared applications are accessed,
determine at least one group of the shared applications accessed by the client computing device during a time window based upon the number of times the shared applications are accessed and the sequential order in which the shared applications are accessed during the time window from the activation history, the at least one group including less than all of the shared applications accessed by the client computing device, and
display the shared applications from the at least one group on the display.

2. The computing system of claim 1 wherein the processor is further configured to display a first menu on the display including the plurality of shared applications, and display a second menu on the display including the shared applications from the at least one group.

3. The computer system of claim 2 wherein the first and second menus are displayed in a same window on the display.

4. The computer system of claim 2 wherein the second menu is displayed in a floating window on the display.

5. The computer system of claim 1 wherein the activation history further includes a sequence in which the shared applications are launched on the client computing device.

6. The computer system of claim 1 wherein the activation history further includes a copy and paste sequence between the shared applications accessed by the client computing device.

7. The computer system of claim 1 wherein the activation history further includes a timing between activation of the shared applications accessed by the client computing device.

8. A method comprising:
at a client computing device comprising a processor and associated memory and having a display associated therewith,
displaying a first menu on the display including a plurality of shared applications,
accessing shared applications selected from the first menu,
determining an activation history of the shared applications by the client computing device, the activation history including a number of times the shared applications are accessed and a sequential order in which the shared applications are accessed,
determining at least one group of the shared applications during a time window based upon the number of times the shared applications are accessed and the sequential order in which the shared applications are accessed during the time window from the activation history, the at least one group including less than all of the shared applications accessed by the client computing device, and
displaying a second menu on the display including shared applications from the at least one group.

9. The method of claim 8 wherein the activation history comprises a sequence in which the shared applications are launched on the client computing device.

10. The method of claim 8 wherein the activation history comprises a copy and paste sequence between the shared applications accessed by the client computing device.

11. A non-transitory computer-readable medium having computer-executable instructions for causing a processor of a client computing device to perform steps comprising:
accessing shared applications selected from among a plurality of shared applications;
determining an activation history of the shared applications by the client computing device, the activation history including a number of times the shared applications are accessed and a sequential order in which the shared applications are accessed;
determining at least one group of the shared applications during a time window based upon the number of times the shared applications are accessed and the sequential order in which the shared applications are accessed during the time window from the activation history, the at least one group including less than all of the shared applications accessed by the client computing device; and
displaying the shared applications from the at least one group on the display.

12. The non-transitory computer-readable medium of claim 11 further having computer executable instructions for causing the processor of the client computing device to display a first menu on the display including the plurality of shared applications, and display a second menu on the display including the shared applications from the at least one group.

13. The non-transitory computer-readable medium of claim 11 wherein the activation history comprises a sequence in which the shared applications are launched on the client computing device.

14. The non-transitory computer-readable medium of claim 11 wherein the activation history comprises a copy and paste sequence between the shared applications accessed by the client computing device.

15. The method of claim 8 wherein determining the activation history further comprises, at the client computing device, running an application program interface (API) configured to capture switch operations.

16. The method of claim 15 wherein determining the at least one group of the shared applications comprises determining the at least one group of the shared applications accessed by the client computing device having a relationship therebetween based upon the captured switch operations.

* * * * *